Oct. 19, 1954 H. N. BLISS 2,691,938
RECORDER AND COLLECTION RECORD CARD THEREFOR
Filed Oct. 7, 1950 3 Sheets-Sheet 1
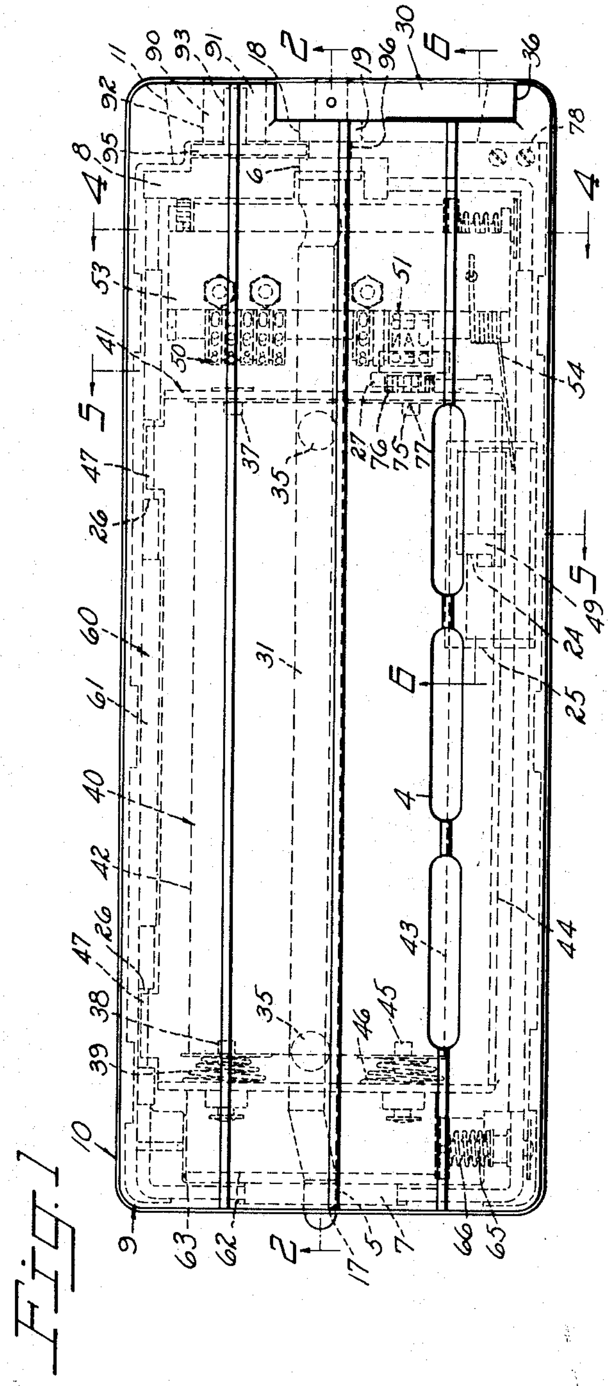
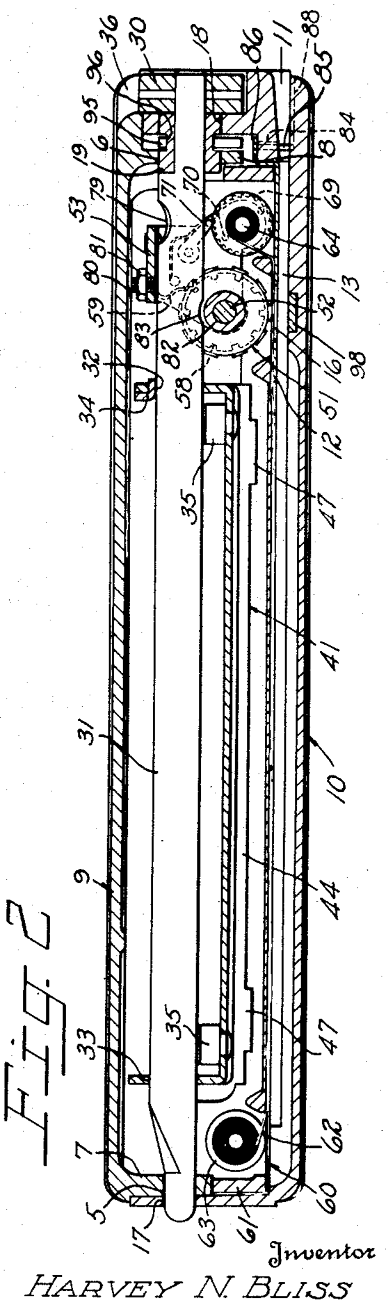
FIG. 2
Inventor
HARVEY N. BLISS
By Lindsey and Prutzman
Attorneys Oct. 19, 1954 H. N. BLISS 2,691,938

RECORDER AND COLLECTION RECORD CARD THEREFOR

Filed Oct. 7, 1950 3 Sheets-Sheet 2

Inventor
HARVEY N. BLISS

By Lindsey and Prutzman
Attorneys

Oct. 19, 1954 H. N. BLISS 2,691,938

RECORDER AND COLLECTION RECORD CARD THEREFOR

Filed Oct. 7, 1950 3 Sheets-Sheet 3

Inventor

HARVEY N. BLISS

By Lindsey and Prutzman

Attorneys

Patented Oct. 19, 1954

2,691,938

UNITED STATES PATENT OFFICE 2,691,938

RECORDER AND COLLECTION RECORD CARD THEREFOR

Harvey N. Bliss, Windsor, Conn., assignor to Veeder-Root Incorporated, Hartford, Conn., a corporation of Connecticut Application October 7, 1950, Serial No. 188,978

8 Claims. (Cl. 101—94)

The present invention relates to devices for use with a card or plate, or the like, and more particularly to such devices where the card or plate, etc., is to be inserted endwise into the device through a slot and it is important that a particular end of the card or plate be inserted and that the card be inserted with the right side up. A specific example of such a device is a recorder for collections of the type disclosed and claimed in the copending patent application of Harvey N. Bliss and Harold B. Vroom, Serial No. 727,268, filed February 7, 1947, now U. S. Patent No. 2,572,241.

In a recorder for collections of the type disclosed in the application referred to above, a collection record card is inserted through a slot into the body of the recorder and then, when the device is actuated, a printing is made on the card by the recorder and at the same time a printing is made on a tallyroll within the recorder from embossed indicia on the card. Because of the cooperation between the card and the recorder during a recording operation, it is essential that the card be placed in predetermined relationship within the recorder. In this particular example the card may be inserted with either side up but a different leading edge must be utilized when the card is inverted. Unless some mechanical means is provided to insure proper insertion of the card, the operator is likely to err when introducing the card or plate into the recorder. This is especially true where the card is of regular shape, for example, generally rectangular in outline, and it is even more particularly true when it is desired to alternately utilize both surfaces of the inserted card or plate.

Accordingly, it is a principal object of the present invention to provide a mechanism to be mounted in the entrance slot of a recorder or the like and a card or plate formed to cooperate therewith to insure that the proper leading edge of the card or plate is inserted through the slot and/or that the card is right side up for insertion of the particular selected edge.

A more special object of the invention is to provide such a mechanism which will be simple and economical in design and functioning, which can be fabricated and assembled with the minimum of cost and effort and which will be foolproof in operation over long periods of time without requiring repair or replacement.

Other objects will be in part obvious, and in part pointed out more in detail hereinafter.

The invention accordingly consists in the features of construction, combination of elements and arrangement of parts which will be exemplified in the construction hereafter set forth and the scope of the application of which will be indicated in the appended claims.

In the drawings:

Figure 1 is a plan view of a recorder for collections having a card entrance slot provided with card control means constructed in accordance with the invention;

Fig. 2 is a cross sectional view taken along the line 2—2 of Fig. 1;

Figure 3:
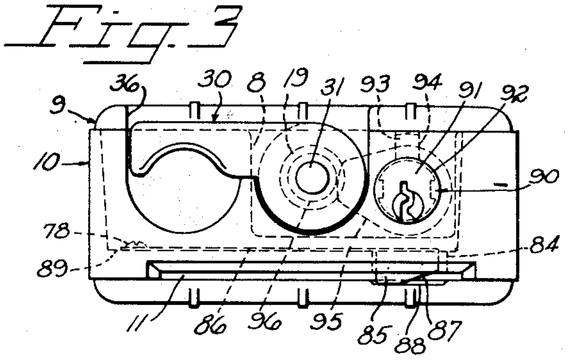
Fig. 3 is an end view of the recorder shown in Fig. 1.

Referring to the drawings, there is shown a recorder for collections of a type, for example, to which the present invention may be advantageously applied. The recorder is contained within a generally rectangular, box-like casing 10 which is provided with a slot 11 at one end through which is adapted to be inserted a customer's receipt card 20 of the type shown more particularly in Fig. 8. The recorder is constructed, as will be described more particularly hereinafter, so that, when the receipt card 20 is inserted through the slot 11 and the operating handle 30 is turned through an angle of 90 degrees, there is printed transversely on the card 20 the date of the collection and an identifying mark which, in the specific example given, is a number for identifying the person making the collection. At the same time, the amount of the collection and the number of the customer's account is printed transversely on a tally roll 40 contained within the casing 10 from either set of embossed indicia 21 on the card 20. The sets of indicia 21 are embossed on opposite faces of the card adjacent the righthand corners as viewed in Fig. 8 so that either surface of the card may be disposed face up provided, however, the correct end of the card is inserted through the slot 11, as more particularly described hereinafter.

In assembling the recording instrument of the present invention, there is first placed in the casing 10 a ribbon guard 12 which is in the form of a flat plate and which rests on the edges of the bottom of the casing 10. The bottom of the casing 10, however, is provided with a longitudinal depression 13 in alignment with the slot 11 so that the customer's receipt card 20 may be inserted into the casing 10 beneath the ribbon guard 12. The ribbon guard 12 has a cut-out portion 14 to permit printing on the tally roll 40 from the raised, i. e., embossed, indicia 21 on the receipt card 20, as more particularly described hereinafter. The ribbon guard 12 also has two openings 15 and 16 which permit the printing of a record on the receipt card 20 from printing roll assemblies 50 and 51, also to be described more particularly hereinafter.

After the ribbon guard 12 is inserted within the casing 10, there is placed thereon a ribbon group assembly generally denoted by the reference numeral 60 which comprises a tray-like frame member 61 on which is mounted an inking ribbon 62 and the printing roll assemblies 50 and 51. The inking ribbon 62 is carried by spools 63 and 64 in the usual manner, which spools are respectively mounted at either end of the frame member 61. The spool 63 is journaled at one end in the frame 61 and at the other end in a longitudinally movable pivot post 65 which is urged inwardly toward the spool by spring 66. The spool 64 is similarly journaled at one end in a pivot post 67 urged inwardly by a spring 68 while the opposite end is journaled in a ratchet wheel 69 rotatably mounted on the frame 61. A plurality of pins 70 receivable in corresponding holes in the spool 64 are utilized to form a driving connection between ratchet wheel 69 and spool 64 whereby, as will be apparent, it is possible to wind the ribbon by rotating the ratchet wheel 69. The spools 63 and 64 may readily be inserted by moving the pivot posts 65 and 67 outwardly against the springs 66 and 68, respectively, following which the posts 65 and 67 are released to engage the spools 63 and 64 and hold them in the position shown. The inking ribbon 62 extends under the bottom of the frame member 61, which is to say, across the top of the ribbon guard 12.

Also mounted on the frame member 61, as heretofore mentioned, are the printing wheel assemblies 50 and 51 which include a shaft 52 carried by a frame 53 which frame is pivotally mounted on the frame member 61 at the axis of the spool 64. The frame 53 is urged upwardly, i. e., pivoted, away from the inking ribbon 62 by the spring 54.

In the specific embodiment shown, the printing wheel assembly 50 comprises a series of side by side number wheels 55 which are adapted to be manually set to any number from "0" to "99999" to identify the particular collector utilizing the instrument. The printing wheel assembly 51 comprises two side by side number wheels 56 and a wheel 57 containing abbreviations of the months of the year, these wheels being manually settable to provide the date on which the instrument is being utilized, i. e., the date of the collection. Each of the printing wheels 55, 56 and 57 is formed with or joined to a ratchet wheel 58 which ratchet wheels are releasably held in desired rotated position by engagement with multifingered resilient detents 59 depending downwardly from the frame 53. Set screws 80 and lock nuts 81 are provided for adjusting the detents 59 so that they engage the ratchet wheels 58 at a proper rotated position for accurate printing. As will be apparent, each of the wheels 55, 56 and 57 can be manually turned in either direction to align the proper indicia at the bottom of the wheels where the printing action takes place and the wheels are retained in this selected position by the detents 59.

Above the ribbon group assembly 60 there is a tally roll group assembly, generally denoted by the reference numeral 41, comprising a frame 44 on which is mounted the tally roll 40 previously referred to. The tally roll 40 is mounted on a plurality of rollers 42 and 43 which extend longitudinally along either side of the frame 44. The roller 42, which is axially recessed at either end, is positioned by a fixed pin 37 at one end and a longitudinally slidable pivot post 38 at the other end urged inwardly into engagement therewith by a spring 39. The roller 43, which is similar to roller 42, is supported at one end by a similar longitudinal pivot post 45 urged inwardly by the springs 46 and at the other end by a shaft 75 to which is fixed a ratchet wheel 76. A transverse pin 77 in the shaft 75 is adapted to engage in a groove in the end of the roller 43 whereby the roller is keyed to the shaft and thus may be turned by turning the ratchet wheel 76. As will be apparent, the rolls 42 and 43 may be readily inserted into position on the frame 44 by pressing the posts 38 and 45 outwardly until the rolls are properly placed, whereupon the posts 38 and 45 are released, causing them to engage the rollers 42 and 43.

Figure 4:
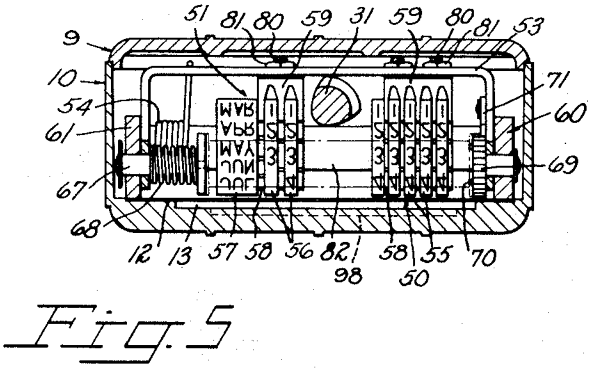
Fig. 4 is a cross sectional view taken along the line 4—4 of Fig. 1.
Figure 5:
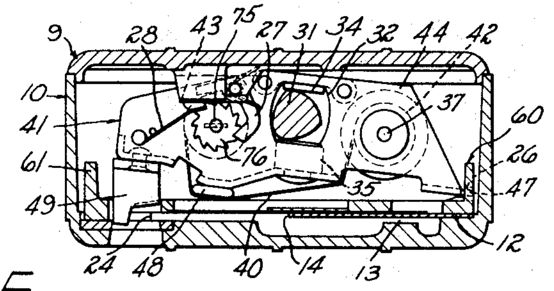
Fig. 5 is a cross sectional view taken along the line 5—5 of Fig. 1.
Figure 6:
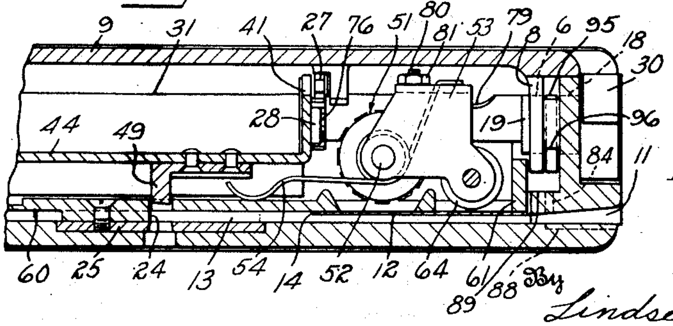
Fig. 6 is a cross sectional view taken along the line 6—6 of Fig. 1.

The frame 44 of the tally roll assembly 41 is provided with lugs 47 which are adapted to be received in slots 26 in the frame member 61 and to pivot thereon. The pivoted position of the tally roll assembly 41 is determined by a cam shaft 31 to which the operating handle 30 is secured, which cam shaft is journaled at either end in the casing 10 and extends through openings 32 and 33 in the frame 44. The opening 32, for example, is provided with an upper wear plate 34 and both openings 32 and 33 being provided therebeneath by wear plugs 35 against which the cam shaft 31 is adapted to bear. The cam shaft 31 is so formed in cross section that, when it is turned in clockwise direction (as viewed in Figs. 3–5) through an angle of 90 degrees, it bears against plugs 35 to cause the tally roll assembly 41 to pivot in a counterclockwise direction and, when the operating handle 30 is pivoted back to the original position shown in Fig. 3, it bears against the top of the openings 32 and 33 to cause the tally roll assembly 41 to be returned in a clockwise direction to its original position shown in Fig. 5.

The cam shaft 31 is of reduced circular cross section at either end where it is journaled in openings 17 and 18 at the ends of the casing 10. The opening 18 is made of sufficient diameter so that it will clear the intermediate camming portion of the shaft 31 whereby the shaft may be slid into operating position through the opening 18 when the device is assembled. A collar 19 on the shaft 31 is utilized to provide a close fit with the opening 18 when shaft 31 is in place. A notch 79 is provided to insure that the shaft 31 will clear the inking ribbon spool 64 when the shaft is turned.

The shaft 31 also extends through openings 5 and 6 formed respectively in downwardly depending lugs 7 and 8 of the cover member 9. The cover member 9 is constructed to closely fit on the top of the casing 10 and to be held tightly thereon by engagement of the lugs 7 and 8 with the shaft 31. Windows 4 are provided so that the operator may view the tally roll 40 to be sure that the device is functioning properly.

The operating handle 30 is received in a recess 36 formed in the end of the casing 10 which recess has the function of limiting turning of the handle through an angle of 90 degrees and of protecting the handle and mechanism actuated thereby from accidental operation or damage.

When the recorder is assembled, the cam shaft 31 extends between the top of the frame 53 and the printing wheel assemblies 50 and 51, resting upon a collar 82 on the shaft 52 which spaces the printing wheels 55 from printing wheels 56 and 57. Accordingly, as the cam shaft 31 is turned by the operating handle 30 to pivot the tally roll assembly 41 downwardly, there is also produced a downward thrust on the printing rollers 50 and 51 causing the frame 53 to pivot downwardly on the frame member 61. The notch 83 in the cam shaft 31 is provided merely to increase the permissible upward pivoting movement of the frame 53 when the shaft 31 is turned to its original position.

The parts are adapted to be locked in assembled position by means of a lock assembly 90 which comprises a conventional lock barrel 91 received in a bore 92 in the casing 10 and having a lug 93 received in a groove 94 cut longitudinally in the top of the bore 92. The barrel 91 has secured thereto a locking arm 95, the end of which is adapted to be received in an annular groove 96 formed in the collar 19 of the shaft 31. The locking position is shown in Fig. 3 with the locking arm 95 received in the groove 96, thereby preventing withdrawal of the shaft 31. When the proper key (not shown) is inserted in the barrel 91 and the locking arm 95 is turned thereby so as to free it from the groove 96, the shaft 31 may be pulled out by grasping the operating handle 30, which immediately releases all of the various assemblies described above and including the cover 9. Accordingly, it is a simple procedure to disassemble the recorder for adjustment or replacement of parts as well as for the more frequent purpose of changing the tally roll or inking ribbon as well as for resetting the printing roll assemblies.

As previously mentioned, the recorder is adapted to print certain information on the receipt card 20 and, in turn, the card will print on the tally roll of the recorder. For this latter purpose, as previously mentioned, the receipt card 20 is provided with raised indicia 21 in the form of embossings which are suitable for printing purposes. In the specific embodiment shown, each set of raised indicia comprises a first group of numerals identifying the customer's account and a second group of numerals stating the amount of the periodic payment in dollars which the customer is obligated to make. In the interests of economy, it is desired to provide the receipt card 20 with a set of raised indicia on both sides of the card so that both sides of the card may be utilized.

Figures 7, 8:
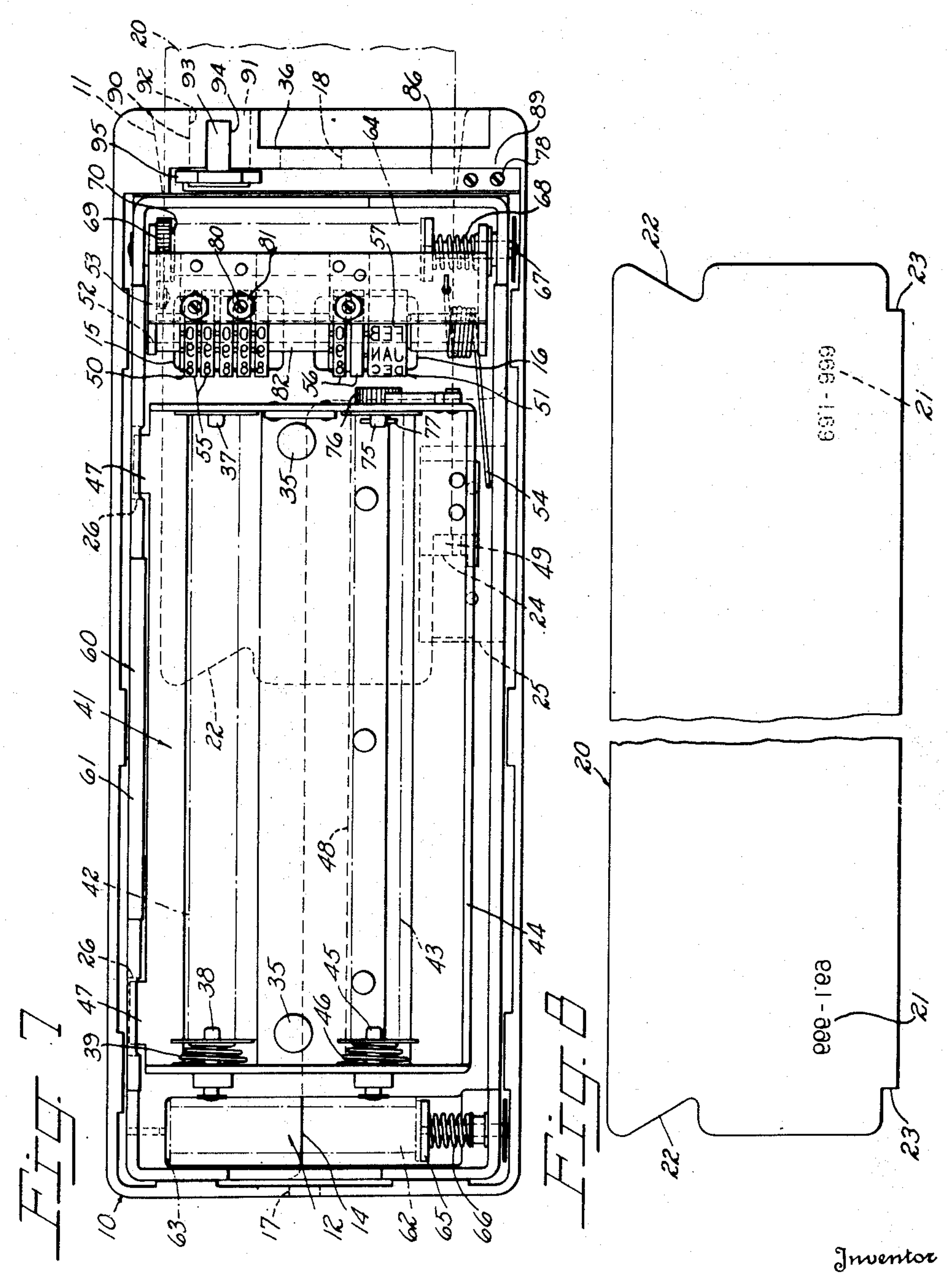
Fig. 7 is a plan view of the recorder for collections with the cover removed and with a tally roll and customer's receipt card shown in dash lines, the receipt card being formed in accordance with the invention for cooperation with the card control means.
Fig. 8 is a plan view of a customer's receipt card constructed in accordance with the invention.

The raised indicia 21 are intended to print against the tally roll 40 where the tally roll 40 extends underneath a platen 48 secured to the frame 44, and therefore, when the card is inserted, the indicia 21 to be used must be facing upwardly and located adjacent the leading edge of the receipt card 20. It also must be disposed slightly to one side of the longitudinal center of the card 20. The proper relationship of the card 20 and the printing mechanism of the recorder is best shown in Figs. 7 and 8 of the drawings. In Fig. 7 the card 20 is indicated by dash lines in printing position, the card being arranged as shown in Fig. 8 of the drawings.

Assuming that the printing rollers 50 and 51 are set to print the identifying number of the collector and the date on which the collection takes place and the record card 20 is properly inserted, the operating handle 30 is turned clockwise, as viewed in Fig. 3, through an angle of 90 degrees, thereby causing the tally roll assembly 41 and the printing wheel assemblies 50 and 51 to be pivoted downwardly as previously described. This causes the printing wheel assemblies 50 and 51 to press against the inking ribbon 62 and the receipt card 20 through the openings 15 and 16 in the ribbon guard 12 thereby making a lateral record on the receipt card 20 of the date and the number of the collector making the collection. A resilient pressure pad 98 may be utilized as an insert in the bottom of the casing 10 to act as a platen beneath the printing wheel assemblies 50 and 51. At the same time, the raised indicia or embossings 21 are caused to press against the tally roll 40 and the inking ribbon 62 by means of the downward pressure of the platen 48, this being permitted by the cut-out portion 14 of the ribbon guard 12. This causes a record to be made on the tally roll of the identifying number of the customer and the amount of the collection, as previously mentioned. The operating handle 30 is then returned to its original position, as shown in Fig. 3, which causes the tally roll assembly 41 and the printing rollers 50 and 51 to pivot upwardly to their original positions.

Immediately upon this return pivoting movement of the tally roll assembly 41, the ratchet wheel 76, which is effective for winding the tally roll 40, as previously described, is rotated in a clockwise direction (as viewed in Fig. 5) by engagement with a spring pressed pawl 27 extending downwardly from the cover 9. This causes the tally roll 40 to be advanced a sufficient distance so that, when a subsequent collection is made, the next recording follows after and spaced laterally from the recording of the previous collection. Such advancement of the tally roll 40 after each collection, of course, continues until the tally roll is entirely used up. To prevent turning of the ratchet wheel 76 in reverse to that described above, i. e., counterclockwise, there is provided a detent 28 in the form of a light spring, the free end of which rides over the teeth of the ratchet wheel 76 during clockwise rotation thereof but which engages therein and locks the wheel against turning in a counterclockwise direction. The pawl 27, being pivotally mounted on the cover 9, will be cammed outwardly and slide over the ratchet wheel during downward pivoting movement of the tally roll assembly 41 without causing any turning thereof.

As previously described, the inking ribbon spool 64 is mounted on and adapted to be turned by a ratchet wheel 69. A spring pressed pawl 71, pivotally mounted on the frame 53 which carries the printing rollers 50 and 51, engages the ratchet wheel 69 and is arranged to turn the wheel a slight amount following each recording so as to present a fresh surface of the inking ribbon for subsequent recordings. When the frame 53 and printing rollers 50 and 51 are pivoted downwardly during the recording operation, the detent slides over the ratchet wheel 69 without turning the same, but on the reverse movement the detent 71 advances the ratchet wheel 63 so as to gradually cause transfer of the inking ribbon 62 from spool 63 to spool 64 in the usual manner.

The receipt card 20 is formed adjacent each leading edge with a prefixed stop shoulder 23 which is adapted to abut against a boss 24 on the bottom of the frame member 61, thereby fixing the initial longitudinal position to which the receipt card 20 may be inserted through the slot 11 and thus fixing the place at which the printing will occur on the card 20 and tally roll 40 as more fully explained hereinafter.

Mounted on the underside of the tally roll assembly frame 44 is a cutter 49 which cooperates with a die block 25 mounted on the boss 24. The operation of the cutter 49 and die block 25 is to cut a piece of predetermined size from the stop shoulder 23 every time a record is made, i. e., every time the frame 44 is pivoted by the shaft 31 so that, when the card is reinserted in the recorder for recording a subsequent transaction, the card will enter the slot 11 a greater predetermined amount, thereby causing consecutive recordings to be made at a different place on the receipt card 20 and on the tally roll 40 in sequence.

As will be apparent, therefore, each time a collection is made, the receipt card 20 is adapted to be advanced into the recorder one additional space so that a consecutive listing of collections is made on the receipt card whereby the card holder as, for example, an insurance policy holder, has a visual record of each collection made including the date thereof and the number of the collector who made each collection. At the same time, there is printed in consecutive order on the tally roll 40 the number of the customer's account and the amount of the collection made. The spacing of the printing from the side edge of the tally roll 40 indicates the extent to which the customer's receipt card 20 has been inserted into the casing 10 and thus indicates whether the account is in arrears, up to date, or paid in advance. If all collections are up to date, the recordings on the tally roll 40 will, of course, follow in a single column.

By reason of the fact that the printing indicia 21 and the shoulder 23 of the receipt card 20 must be located at a particular place in the recorder in order for the recorder and card to cooperate properly, it becomes essential that the proper leading edge of the card be inserted through the slot 11. It is also important that the proper side of the card faces upwardly. In accordance with the present invention, I have provided a mechanism adapted to be mounted adjacent the slot 11 and have formed the card 20 in such a manner that they cooperate to prevent insertion of the card except in the proper manner.

As best shown in Figs. 2, 3 and 7, I have provided a lug 85 which is vertically slidable in a slot 84 disposed in the casing 10 inwardly of the entrance slot 11. The lower surface of the entrance slot 11 is notched as indicated at 88 to receive the nose of the lug 85. The lug 85 is biased downwardly so as to extend across the slot 11 with its nose seated in the notch 88 by means of a flat flexible spring arm 86 which is secured at one end to the lug and which is fastened at its other end on a shoulder 89 of the casing 10, such as by means of screws 78. The lug 85 in its normal position, therefore, will block the entrance of a card through the slot 11.

In order that the lug may be moved out of obstructing position when the card 20 is inserted with the proper leading edge and right side up, I have formed the lug 85 with an upwardly and outwardly inclined edge 87 and have provided the card 20 with a rearwardly inclined edge 22 formed by cutting a notch adjacent one side of each of the leading edges of the receipt card 20.

When the card is properly inserted, the rearwardly inclined camming edge 22 engages the upwardly inclined edge 87 of lug 85 with the result that, when the card is positioned inwardly through the slot 11, the lug 85 is cammed out of obstructing position. As will be apparent, if the card were inverted about its longitudinal axis, it could not be inserted because the inclined camming edge 22 would not be in proper position to cooperate with the inclined edge 87 of the lug 85. On the other hand, if the card 20 were not inverted and an attempt should be made to insert the opposite end of the card, the notch 22 in such opposite end would be improperly located for camming cooperation with the lug 85. Accordingly, it is insured that the card 20 can be inserted into the recorder through the slot 11 only if the printing indicia 21 and shoulder 23 are in proper cooperating position.

In order to permit use of both sides of the card, I have found that it is necessary to place the two sets of printing indicia 21 on the same side of the longitudinal center of the card 20, whereby the notches 22 may also be placed on the same but opposite side of the longitudinal center of the card 20. It therefore becomes possible to utilize both sides of the receipt card 20 without interfering with the proper cooperation of the card 20 and the lug 85.

It thus will be seen that there has been provided a simple mechanism and cooperating form for the receipt card 20 which insures that the card will always be properly inserted into the recorder, which mechanism is of simple construction and will function efficiently over long periods of time.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

It is also to be understood that the language used in the following claims is intended to cover all of the generic and specific features of the invention herein described and all statements of the scope of the invention which, as a matter of language, might be said to fall therebetween.

I claim as my invention:

1. In combination, a card or the like adapted to be printed upon, a recorder having an entranceway of predetermined width for the insertion of said card or the like and means for printing a record on an inserted card, means normally blocking the insertion of a card into the entranceway comprising a stop member mounted for movement transversely of the entranceway into non-obstructing position, said member being formed with a diagonal edge, and said card having a rearwardly inclined leading edge engageable with said diagonal edge to cam the member into non-obstructing position.

2. In combination, a card or the like adapted to be printed upon, a recorder having an entranceway of predetermined width for the insertion of said card or the like and means for printing a record on an inserted card, a stop member mounted for movement transversely of the entranceway between an obstructing and a non-obstructing position, and means biasing the stop member into obstructing position, said stop member being formed with a surface substantially perpendicular to and facing the entranceway and having a side edge extending diagonally and transversely of the entranceway, and an inclined leading edge on said card or the like engageable with said side edge as said card is inserted through said entranceway to cam the stop member into non-obstructing position.

3. In combination, a card or the like adapted to be printed upon, a recorder device having an entranceway of predetermined width for the insertion of said card or the like and means for printing a record on an inserted card, means for blocking improper insertion of the card comprising a member normally extending across the entranceway and mounted for movement transversely of the entranceway into non-obstructing position, said member having a flat surface substantially perpendicular to and facing the entranceway and having a side edge extending diagonally and transversely of the entranceway and offset from the center of the entranceway whereby the said member will normally block the entrance of a card or the like, and a rearwardly inclined leading edge on said card correspondingly offset from the center and engageable with said side edge during insertion of said card to cam said member out of obstructing position.

4. In combination, a card or the like adapted to be printed upon, a recorder having a slot-type entranceway of predetermined width for the insertion of said card or the like and means for printing a record on an inserted card, a small plate having an inclined side edge, means including a spring for positioning the plate transversely of the entranceway with said side edge offset from the center of the entranceway but permitting the plate to be cammed transversely of the entranceway to non-obstructing position, and a rearwardly inclined similarly offset portion on the leading edge of said card or the like engageable with said side edge to cam said plate to non-obstructing position when said card is inserted through said entranceway.

5. In combination, a card or the like adapted to be printed upon a device having a slot-type entranceway of predetermined width for the insertion of said card or the like and means for printing a record on an inserted card, a flexible arm mounted transversely of the entranceway, a depending lug on the arm normally extending across the entranceway and having an inclined side edge, said arm and lug being positioned so that the said inclined edge is offset from the center of the entranceway, and a rearwardly inclined similarly offset portion on the leading edge of said card or the like engageable with said side edge to cam said lug from across said entranceway when said card is inserted therein.

6. In combination, a card or the like having printed indicia, a recorder having an entranceway for the card and means for printing a record from the inserted card, and means for blocking the insertion of the card unless the card is correctly introduced into the passageway comprising a stop member biased into obstructing position extending transversely across the passageway but mounted for movement transversely of the entranceway into non-obstructing position, said member being formed with an inclined side edge and said card, when properly inserted, having a similarly offset rearwardly inclined leading edge for engaging with said inclined side edge to cam the stop member into non-obstructing position.

7. In combination, a card or the like having printing indicia, a recorder having an entranceway for the card and means for printing a record from the inserted card, and means for blocking the insertion of the card unless the card is correctly introduced into the passageway comprising a stop member mounted for movement transversely of the entranceway between an obstructing and non-obstructing position, and means biasing the stop member into obstructing position, said member being formed with an inclined side edge offset from the center of the passageway and said card having a similarly offset rearwardly inclined leading edge for engaging with said inclined side edge to cam the stop member into non-obstructing position when the card is introduced with the printing indicia in proper position.

8. In combination, a card provided with a set of printing indicia on both faces and disposed on the same side of the longitudinal center of the card and having rearwardly inclined leading edges on the opposite side of the longitudinal center, a recorder having an entranceway for the card and provided with means for printing on the card and for printing a record from a set of the indicia on the card, and a stop member normally extending across the entranceway and mounted for movement transversely of the entranceway into non-obstructing position, said member having a side edge extending diagonally of the entranceway and offset from the center of the entranceway for engagement by one of said rearwardly inclined leading edges of the card to cause the member to be cammed to non-obstructing position.

References Cited in the file of this patent

UNITED STATES PATENTS

| Number | Name | Date |
|---|---|---|
| 1,254,825 | Martin | Jan. 29, 1918 |
| 1,781,282 | Hulett | Nov. 11, 1930 |
| 2,019,301 | Friden | Oct. 29, 1935 |
| 2,039,072 | Dugdale | Apr. 28, 1936 |
| 2,281,577 | Haynes | May 5, 1942 |
| 2,342,699 | Sand | Feb. 29, 1944 |
| 2,346,145 | Bliss | Apr. 11, 1944 |
| 2,352,907 | Mangan | July 4, 1944 |
| 2,535,725 | Curtis | Dec. 26, 1950 |
| 2,555,148 | Mitchell | May 29, 1951 |
| 2,600,990 | Hanson | June 17, 1952 |